Aug. 5, 1958 J. W. FIELDS 2,846,267
TIPPING BODY

Filed June 2, 1955 4 Sheets-Sheet 1

Inventor
John William Fields by Parker & Carter
Attorneys

Aug. 5, 1958   J. W. FIELDS   2,846,267
TIPPING BODY

Filed June 2, 1955   4 Sheets-Sheet 3

Inventor
John William Fields by Parker & Carter
Attorneys

Aug. 5, 1958    J. W. FIELDS    2,846,267
TIPPING BODY
Filed June 2, 1955    4 Sheets-Sheet 4
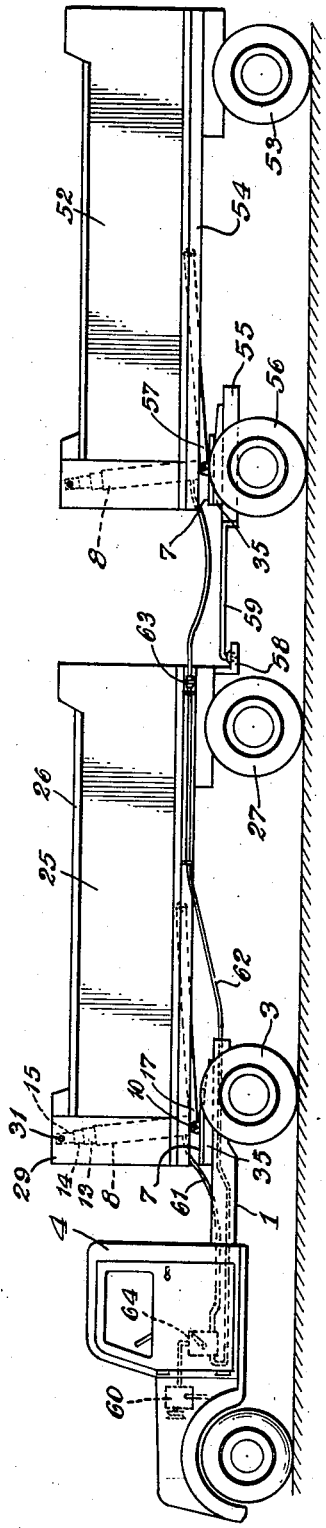
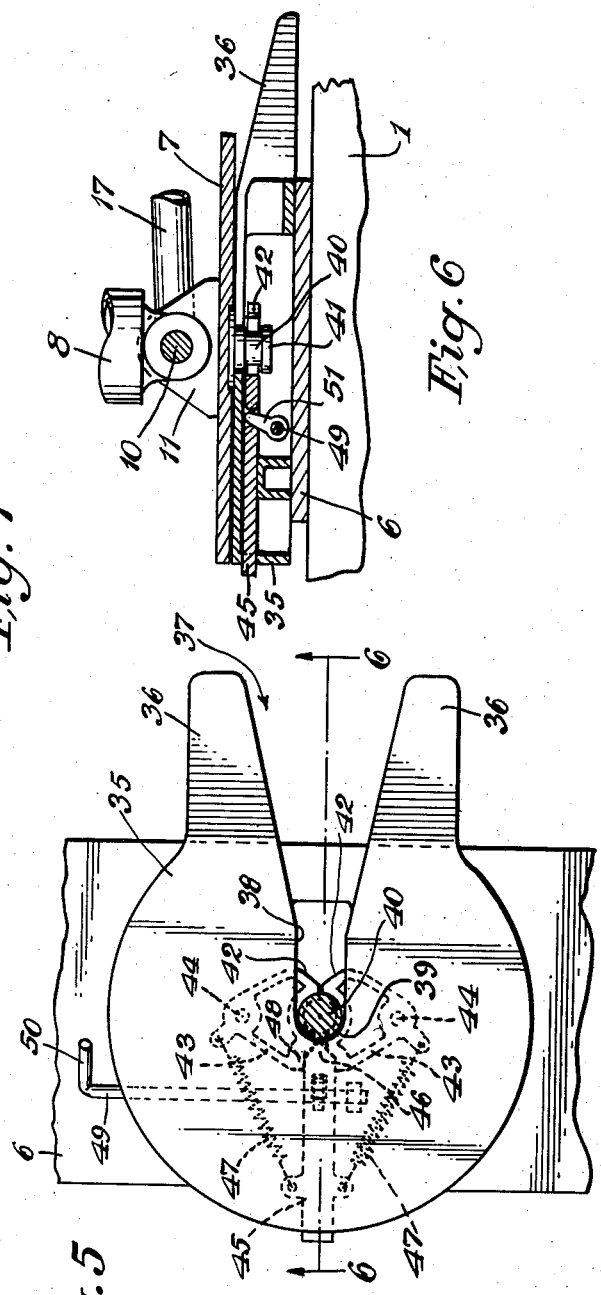
Fig. 5
Fig. 6
Fig. 7
Inventor
John William Fields
by Parker & Carter
Attorneys

United States Patent Office 2,846,267
Patented Aug. 5, 1958

2,846,267

TIPPING BODY

John William Fields, Oklahoma City, Okla., assignor to Anthony Company, Streator, Ill., a corporation of Illinois Application June 2, 1955, Serial No. 512,744

12 Claims. (Cl. 298—20)

This invention relates to a tipping truck and to the provision of means for tipping or dumping a body or container which is carried by a tractor-trailer combination. It has for one object to provide means for directly raising one end of the body or container to tip it.

Another object of the invention is to provide, in connection with a tractor-trailer body assembly, means exerting an upwardly directed body tipping force between the tractor and that end of the body nearest the tractor for directly raising that end of the body into tipping position.

Other objects will appear from time to time throughout the specification and claims.

The invention is illustrated more or less diagrammatically in the accompanying drawings, wherein:

Figure 5 is a plan view on an enlarged scale showing one form of a fifth wheel by means of which the trailer may be connected to the traction unit;

Figure 6 is a vertical section taken at line 6—6 of Figure 5 showing the fifth wheel, kingpin, upper fifth wheel and associated parts; and Figure 7 is a side elevation showing diagrammatically a system in which a traction unit has mounted in part upon it and attached to it a trailer to which a second trailer is connected.

Like parts are indicated by like characters throughout the specification and drawings.

The invention in the form shown is applied to a tractor trailer combination and comprises a tractor or power unit of any suitable nature. Only so much of the tractor unit is shown as is necessary for an understanding of the device. The combination includes, in addition to the tractor, a container or platform or so-called tipping body fastened to the tractor preferably through a fifth wheel to permit relative movement when the assembly is driven along the road. This arrangement is conventional and is well-known generally in connection with tractor-trailer truck assemblies. The body or container is supported at its rear end upon a conventional wheel and axle assembly which will normally include suitable springing means. The invention is not limited to the particular arrangement of wheels at the rear of the body.

In addition to the parts thus far described, the assembly includes a telescopic or other hydraulic piston and cylinder assembly joined to an upper fifth wheel and adapted to be supported on the truck preferably in alignment with the center of rotation of the fifth wheel and arranged to exert its lifting effect preferably directly upon the forward end of the truck body or container. Draft means, in addition to the hoisting means, are arranged and they are connected to the truck through the fifth wheel, to which they are joined and to the body or its frame so that the pulling or draft effect of the truck is exerted through this draft means. The structure thus far described generally will be described in detail below.

The tractor or tractive means above described comprises a frame 1, an axle 2, wheels 3 and may include a cab 4. Springs 5 may be included, if desired, and, conventionally, springs of some sort are generally used.

Figure 2:
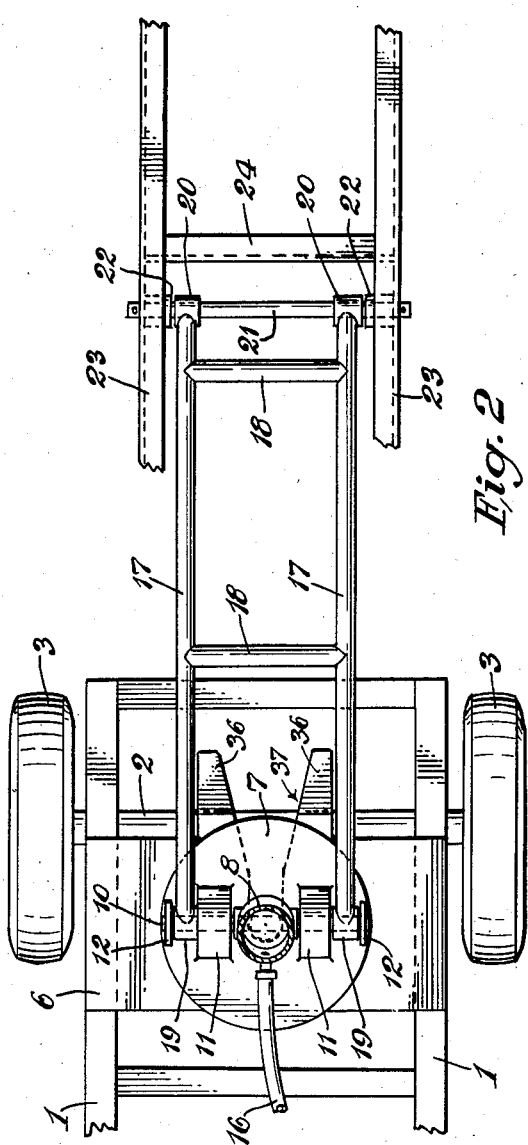
Figure 2 is a horizontal section taken on an enlarged scale at line 2—2 of Figure 1.
Figure 4:
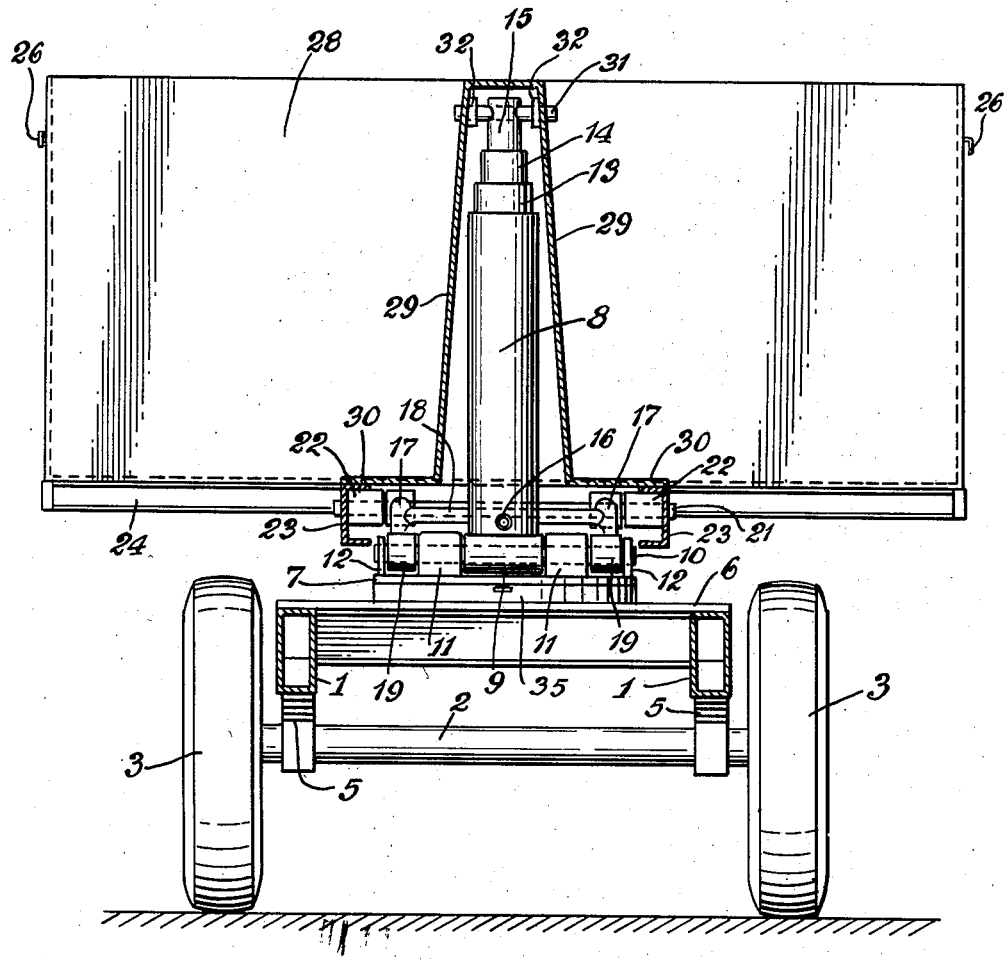
Figure 4 is a transverse vertical cross section taken at line 4—4 of Figure 1.

A transverse platform or supporting member 6 extends between the frame portions 1 of the tractor, as shown particularly in Figures 2 and 4, and upon it there is supported for rotation about a generally vertical axis a so-called upper fifth wheel or foot member 7.

A piston and cylinder hoisting assembly is mounted upon the upper fifth wheel for swinging movement and is preferably aligned with the axis of rotation of the upper fifth wheel or foot member. In the particular form here shown the hoisting means includes a telescopic cylinder and piston.

The lower and outermost member of the hoisting assembly comprises the cylinder 8 which is provided with a trunnion portion 9 through which a shaft 10 extends. The shaft is received in bearings 11, 11 attached to the upper fifth wheel or foot member 7 and may also be received in relatively smaller bearings 12, 12 also attached to the upper fifth wheel or foot member 7. By this means the hydraulic piston and cylinder assembly is arranged for swinging. In the particular form here shown the assembly includes additionally a cylinder 13 within the cylinder 8 and a cylinder 14 within the cylinder 13. The hoisting assembly includes a piston rod 15 secured to a piston, not shown, within the cylinder 14. The telescopic piston and cylinder assembly may be of almost any suitable design and a conventional telescopic hoist may be used. Pressure fluid is supplied to the cylinder assembly by means of a pipe or passage member 16 which may be flexible, if desired, and is connected to a source of pressure fluid such as a pump carried on the tractor and driven from the tractor engine or from some other source of power.

Pivoted also to the upper fifth wheel or foot member and to the shaft 10 is a draft member or assembly which in the form here shown is of the type referred to as an H frame. As shown, it includes two longitudinal members 17, 17 joined by one or more transverse or cross members 18, 18. The forward end of the members 18 have bearing portions 19 which are positioned about the shaft 10. The rearward ends of the draft members 17 have bearing portions 20 which are positioned about a shaft 21. This shaft is supported by bearing portions 22 fixed on the frame members 23 of the body. These frame members are joined by one or more transverse parts 24 and define a generally rectangular frame upon which a body or container 25 is positioned. This body may be of any desired form. As shown, it is of generally rectangular plan and may include at its upper edges flanges 26. It is supported upon wheels 27 generally at its rear end. The details of the wheels and the axle or other supports for them and any spring arrangement are not shown as they form no essential part of the invention. Normally a tailgate will be provided. That has been omitted because for some purposes none will be needed and the details of the tailgate, if one is present, form no essential part of the invention. The forward end of the body is preferably closed by a forward transverse wall 28.

Figure 1:
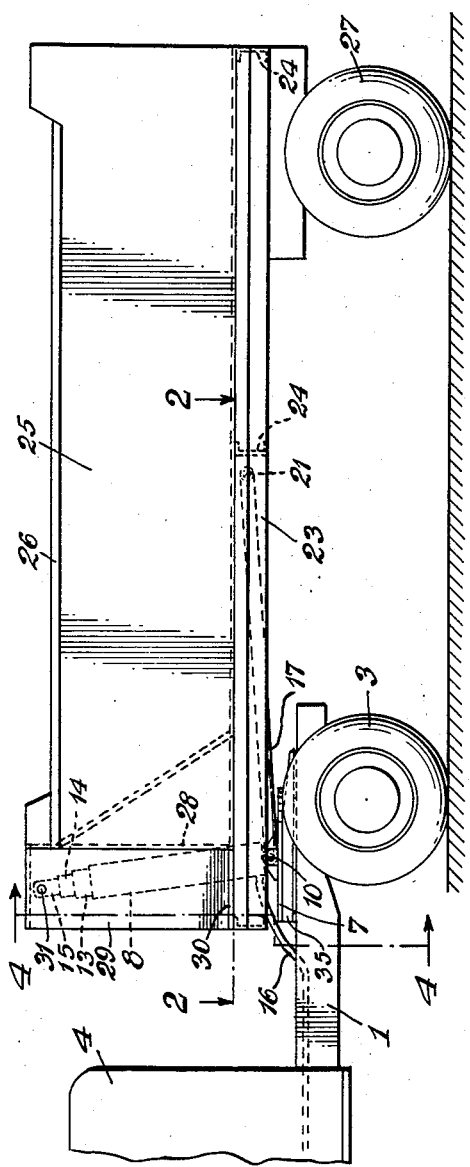
Figure 1 is a side elevation of one form of the device.

A housing 29 overlies the piston and cylinder assembly, as shown particularly in Figures 1 and 4. It may be provided with integral portions 30 or these portions may be otherwise formed, but the housing 29 is provided with means to support it and connect it to the frame members 23. A shaft 31 is carried in bearing members 32 which are fixed to the housing 29 adjacent its upper end, as shown particularly in Figure 4, and by this means the piston 15 is connected to the housing 29 and through it to the frame members 23 by means of which the body or container or platform is supported.

In particular it is understood that the trailer or tractor may embody any sort of ground-contacting members. The invention is not limited to wheeled vehicles. Vehicles of the type having belt treads, as now currently used on heavy load-carrying vehicles and military tanks, are within the contemplation of the invention as fully and equally as are wheeled vehicles. The invention is also understood to include the use of trailers and semitrailers. Where the word "trailer" appears in the claims, it is to be understood, therefore, as covering both semitrailers and trailers. In general the expression "semitrailers" has been used in the past to apply to vehicles in which part of the load of the vehicle, when in operative association with a tractor, is supported by or from the tractor and, also, the expression "trailer" has generally been used to designate a vehicle complete in itself in the sense that it is fully supported by its own running gear and is not carried or supported in part by the tractor which draws it. For the purpose of simplicity and to avoid repetition in this specification and claims, both is to be understood that the word "trailer" includes both trailers and semitrailers and both are illustrated in the drawings and described in the specification. Although the device shown particularly in the first four figures would normally be described as a "semitrailer," since it is in part supported upon the traction unit, the word "trailer" is to be understood as covering it and as meaning any comparable vehicle which is drawn from a traction unit and is not self-propelled.

In Figures 5 and 6 there is shown a typical and conventional fifth wheel trailer attachment means. In its details it is not claimed. Other means for detachably attaching a trailer to the traction unit might be used and any suitable such means is within the contemplation of the invention. As shown in detail in Figures 5 and 6, a fifth wheel member 35 of generally rounded plan is mounted on the cross member 6 of the traction unit. It is preferably rigidly mounted thereon so that it neither tilts nor rotates. It is provided with outwardly diverging jaw members 36 between which is a tapering opening 37. This opening narrows to a generally straight-sided slot 38 which may be rounded at its inner end, as at 39. The platelike foot or upper fifth wheel member 7 which appears in the other figures is also shown in these figures and carries the piston and cylinder assembly and the draft arms 17. A pin 40 is secured to the member 7 and as shown particularly in Figure 6, is provided with an enlarged head portion 41.

When the trailer is to be secured to the tractor the two are moved relatively so that the pin 40 is brought between the members 36 and finally into the slot 39 and to the position shown in Figure 5 at the inner end of the slot 38. In this movement the pin 40 contacts the cam faces 42 of latch members 43. These members are preferably pivoted, or otherwise movably mounted, as at 44, and are of such thickness as to fit above the head 41 and to embrace the pin 40 as shown in Figures 5 and 6.

45 is a lock bar slidably mounted in or supported by the fifth wheel member 35. It is provided with a pointed end 46 which, in the locking position, is carried by springs 47 to a position of rest between the shoulders 48 of the latch members 43. In this position the latch members cannot swing apart, and remain latched to hold the pin 40 against displacement. The springs 47, as shown, are secured at suitable points to the latch members 43 and to the lock bar 45.

A lock operating shaft 49 is journaled in suitable bearings, preferably in the fifth wheel member 35, and is provided with an operating handle portion 50. It is provided also with a lever 51 which engages the lock bar 45 and by means of which the lock bar may be moved. When the lock bar is withdrawn from the position shown in dotted lines in Figure 5, the latch members are not held against rotation and the pin 40 may be moved into locking position or away from that position to permit, thus, engagement of the pin or disengagement of the pin for connecting or disconnecting a trailer from the traction unit. When the lock bar is moved to the position of Figure 5 it prevents movement of the latch members and thus holds the pin 40 against disengagement. The springs 47 are biased to move the lock bar into the locking position. Any other suitable engaging and disengaging means may be used to join a trailer removably to the traction unit. Several such are available on the market at the present and the particular form shown is merely illustrative of the fact that means are provided for attaching the trailer to a traction unit and for disengaging it when desired.

In Figure 7 there is shown means for a system of hauling and dumping in which two trailers are used. The first trailer rests in part upon the traction unit and is substantially the same as that shown in the preceding figures. It differs from them only in the fact that it is provided with connection means to which a second trailer may be connected and in the further fact that it has attached to it pressure lines by means of which pressure fluid may be delivered from the same source as that from which it is delivered to the leading tractor. The showing of Figure 7 thus differs from that of Figure 1 primarily in the fact that a second trailer is added and that connection means for it are added.

A second trailer is shown in Figure 7 and comprises a tipping body 52 carried at its rear upon wheels 53 which are carried on an axle and any suitable running gear. Springs, which are not shown, will normally be included in the assembly. Since the trailer 52 is intended to dump at the rear end, a tail gate will normally be added; and such tail gates being well known and generally conventional, none is shown in order to simplify the overall showing. The same is true of the leading trailer 25 which appears in the several figures. The trailer body 52 may be supported on a frame 54 and is attached to that frame. At its forward end the rear trailer is carried on a supporting assembly which includes a frame 55 and wheels or other running gear 56. An upper fifth wheel 7 is shown and it may be secured to a main fifth wheel assembly, including the member 35, as shown in Figures 5 and 6. Actually as shown in Figure 7 there is present the fifth wheel member 35 which appears in Figures 5 and 6. A piston and cylinder assembly identical with that shown on the leading trailer is used in and appears in the following trailer 52 and it is therefore not described and carries the same reference numerals as those used in the description of the piston and cylinder assembly where it is referred to above. A pair of traction bars or traction elements 57, preferably identical with the traction bars or elements 17 of the leading trailer, is used and they are positioned in the same manner as described above in connection with the leading trailer where it is shown in detail in Figures 1 and 2.

In the form shown in Figure 7 the leading trailer is provided with a connection-receiving member 58 to which a connector or draft bar 59 is secured. This draft bar is secured also to the member 55 of the following trailer. Together the members 58 and 59 furnish means for joining the trailers together so that the following trailer is pulled from the leading trailer and the two are connected for swinging to permit turning and the like. The connection means are generally conventional and need not be shown in detail.

It is preferable to provide on the tractor a single source of pressure fluid and it is indicated diagrammatically in Figure 7 as comprising a pump 60. The pump is connected to the piston and cylinder assembly on the leading trailer by a line 61 and it is connected to the piston and cylinder assembly on the following trailer by a second line 62. A joint 63 in this second line permits connecting and disconnecting the line when the leading trailer and the following trailer are to be disconnected.

Valve means, indicated diagrammatically as at 64 in Figure 7, are provided for accomplishing the dumping of the two trailers separately and selectively.

Although I have shown an operative form of my device, the invention is not limited to the particular details shown. Many changes may be made in the form, shape and arrangement of parts without departing from the spirit of the invention. In particular, the invention is not limited to any special running gear. Wheels, traction belts and the like may suffice. Nor is the invention limited to any spring arrangement or tail gate arrangement. Since these are conventional in each case, they have not been illustarted and they are not claimed. Although it is preferable that the trailers be connected to the traction units removably, if desired they may be made nonremovable so that the leading trailer and tractor may, if desired, be secured together as a permanent articulated load-carrying assembly.

The member 35 is a generally conventional fifth wheel. The member 7 has been called an "upper fifth wheel," since it rests on the main fifth wheel 35, when the tractor and trailer are connected. The member 7 may be called also a "foot" since it acts as a base for the cylinder 8 and the draft members 17. It may be of any plan so long as it is of sufficient size to receive the parts 8 and 17 and to act as a base for them, either on the fifth wheel 35 or on any other support.

Figure 3:
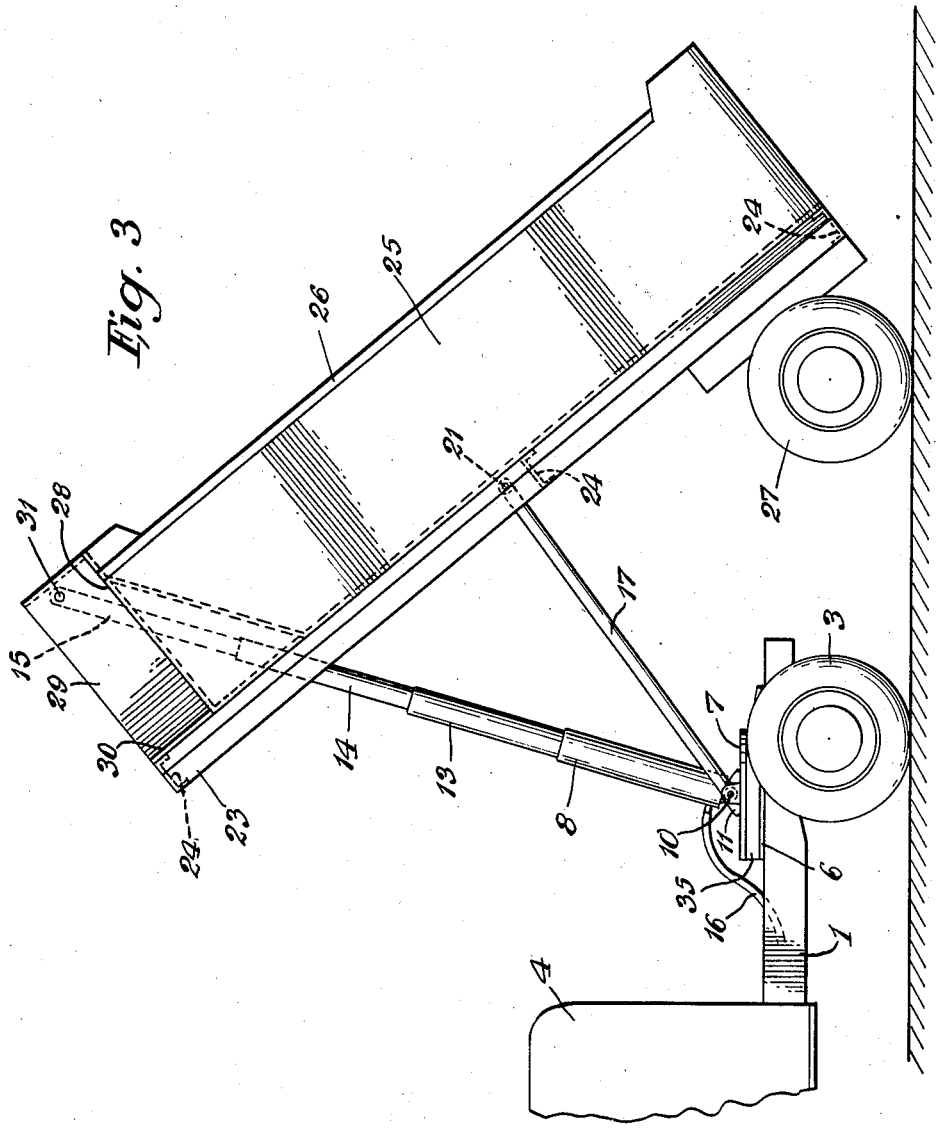
Figure 3 is a side elevation of the structure of Figure 1 with the body or container in the raised position.

The use and operation of this invention are as follows:

The device of this invention in the form shown comprises a complete tractor and trailer unit articulated about a fifth wheel assembly and including draft means whereby the trailer unit comprising the dumping body, its frame, if any, and its running gear are connected to the tractor unit. In addition to this mechanism, which comprises the load-carrying and power units, there is a tipping means and in the particular form here shown the tipping means comprises the piston and cylinder assembly. It is supported on the tractor unit and preferably on the fifth wheel and is connected to the body or to its frame. When it is desired to tip the body, fluid under pressure is introduced into the piston and cylinder assembly. This pressure fluid elongates the assembly and since one end of the assembly is fastened to the tipping platform body or receptacle, that end is raised and the body is tipped. During the tipping movement the draft member or means revolves about a radius, the center of which is its pivot point on the fifth wheel of the tractor. As the piston and cylinder assembly raises the forward end of the body to tip it, the rear wheels which support the rear end of the tipping body move forwardly from the position of Figure 1 to that of Figure 3. Raising of the forward end of the body to tip it thus causes the rearward end of the body to move forwardly as the result of the raising and tipping action. The tipping action is, of course, caused by the elongation of the hydraulic piston and cylinder assembly under the forward end of the body. The tipping of the body would occur whenever the piston and cylinder assembly is elongated and the effect of the draft connection is, so far as the tipping is concerned, to move the rear end of the tipped body or platform forwardly as the result of the tipping which is caused by the direct action of the piston and cylinder assembly on the forward end of the body. The draft connection also controls the swinging action of the cylinder and limits it.

The invention in the particular form here shown is applied to an open-topped body or container but the same general structure and the same essential operation would be provided in the event that the device had no side walls and comprised merely a load-carrying platform. The invention is, therefore, not limited to any particular details of the construction of the load-carrying members and when the word "body" is used in the specification and claims, it is to be understood as meaning any member mounted on the trailer and tipped from the tractor which is usable as a load-carrying means. For the purposes of this invention it is immaterial whether or not the trailer is normally or frequently disconnected from the tractor. In some cases the trailer and tractor assembly will comprise a unit which is not disconnected in normal use and for other purposes the trailer assembly may be disconnected from the tractor so that the tractor may be used for other purposes and to pull other sorts of loads than that comprising the particular tipping or dumping trailer shown.

The operation of the device shown in Figure 7 differs only from the operation of the device shown in the earlier figures by the necessity of dumping two or more dump units, one after the other. When a plurality of such units is assembled together in a train, as shown in Figure 7, they will normally be dumped one after the other. Thus the train will be brought to a point at which the rear or following trailer is in position to be dumped. The valve means will be operated to direct pressure fluid through the line 62 and to the piston and cylinder assembly of the following trailer and the body 52 will be dumped as the trailer is tipped due to the extension of the piston and cylinder assembly. After the dumping of the following trailer is complete, it will be disconnected from the leading trailer and that trailer will then be moved to the point at which it is desired to dump it, whereupon the valve means will be operated to direct pressure fluid to the piston and cylinder assembly of the leading trailer and it will be dumped. Although only two trailers appear "in train," more might be used and the process above described for dumping the two would follow generally the same steps mentioned, one trailer being dumped after the other until all have been dumped, in each case the dumped trailer being normally disconnected before a trailer in line ahead of it is dumped. After the completion of the dumping, the trailers may be reconnected and the train may proceed to a point of further filling if desired.

I claim:

1. In combination an automotive tractor, a fifth wheel thereon, a load-carrying body, ground-contacting means for said load-carrying body connected thereto at a point separated from said tractor, an upper fifth wheel, means for connecting said upper fifth wheel and said tractor draft means of substantially fixed length under all operating conditions connected to said upper fifth wheel and to said load-carrying body for relative movement with respect to said fifth wheel and to said load-carrying body, a hydraulic piston and cylinder assembly pivoted adjacent one end thereof upon said upper fifth wheel and at its other end connected to said body for relative movement with respect to said body, and means carried by said tractor for supplying pressure fluid to said piston and cylinder assembly to cause its elongation and thereby to raise the forward end of the body and to tip it.

2. In combination an automotive tractor, a fifth wheel thereon, an upper fifth wheel member removably supported by said first fifth wheel, a load-carrying body, wheels for said load-carrying body connected thereto at a point separated from said tractor, draft means of substantially fixed length under all operating conditions connected to said upper fifth wheel member and to said load-carrying body for relative movement with respect to said fifth wheel and to said load-carrying body, a hydraulic piston and cylinder assembly pivoted adjacent one end thereof upon said upper fifth wheel member and at its other end connected to said body for relative movement with respect to said body, and means carried by said tractor for supplying pressure fluid to said piston and cylinder assembly to cause its elongation and thereby to raise the forward end of the body and to tip it.

3. In combination an automotive tractor, a fifth wheel thereon, an upper fifth wheel member removably supported from said first fifth wheel, a load-carrying body, ground-contacting means for said load-carrying body connected thereto at a point separated from said tractor, draft means of substantially fixed length under all operating conditions pivotally connected to said upper fifth wheel member and to said load-carrying body for relative movement with respect to said fifth wheel and to said load-carrying body, a hydraulic piston and cylinder assembly pivoted at one end thereof upon said upper fifth wheel member coaxially with respect to the pivotal connection of said draft means thereto and at its other end connected to said body for relative movement with respect to said body, and means carried by said tractor for supplying pressure fluid to said piston and cylinder assembly to cause its elongation and thereby to raise the forward end of the body and to tip it.

4. A trailer comprising a body, ground-contacting members connected to said body, means connected to said body for rotating said body about said ground-contacting members, said means comprising a piston and cylinder assembly pivoted at one end to said body at a forward portion thereof, a foot member pivotally connected to and carried by said piston and cylinder assembly and a draft member of substantially fixed length under all operating conditions pivotally connected at its opposite ends to said foot member and to said body.

5. A trailer comprising a body, ground-contacting members connected to said body beneath a rear portion thereof, means connected to said body for rotating said body about said ground-contacting members, said means comprising a piston and cylinder assembly pivoted at one end to said body at a forward portion thereof, a foot member pivotally connected to and carried by said piston and cylinder assembly, and a generally rigid draft member of substantially fixed length under all operating conditions pivotally connected at its opposite ends to said foot member and to said body.

6. A trailer comprising a body, ground-contacting members connected to said body beneath a rear portion thereof means connected to said body for rotating said body about said ground-contacting members, said means comprising a piston and cylinder assembly pivoted at one end to said body at a forward portion thereof, a foot member pivotally connected to and carried by said piston and cylinder assembly, and a generally rigid draft member of substantially fixed length under all operating conditions pivotally connected at its opposite ends to said foot member and to said body, said draft member being pivotally connected to said body member at a point generally intermediate the points at which said ground-contacting members and said hydraulic member are connected to said body.

7. For use with a tractor having a fifth wheel, a trailer body, said trailer body having ground-contacting members connected thereto adjacent a rear portion thereof, an expandable hydraulic piston and cylinder assembly pivotally connected to said trailer adjacent a forward portion thereof, a generally rigid draft member of substantially fixed length under all operating conditions pivotally connected at one end to said trailer, a connector member on the trailer positioned to be supported on the fifth wheel of a tractor, said hydraulic cylinder and said draft member being pivotally connected at their opposite ends to said connector member, and means for securing said connector member in operative relation to the fifth wheel of said tractor whereby said draft member is effective to insure motion of said ground-contacting members toward said tractor during expansion of said piston and cylinder assembly.

8. For use with a tractor having a fifth wheel, a trailer body, said trailer body having ground-contacting wheels connected thereto beneath a rear portion thereof, means carried by said trailer body for tilting said body about a pivot supported by said wheels and for moving said wheels toward said tractor, said means including a hydraulic cylinder pivoted at one end to a forward portion of said trailer body, a draft member of substantially fixed length under all operating conditions pivotally connected at one end to said trailer body at a point between said wheels and said hydraulic cylinder, a foot member for said trailer, said hydraulic cylinder and said draft member having their opposite ends connected to said foot member for pivotal movement about a common axis, said foot member having a portion thereof positioned for engagement with the fifth wheel of said tractor for securement thereto.

9. An adapter structure for connecting trailers to tractors having fifth wheels, said adapter structure comprising a foot member for supporting the trailer on the fifth wheel of a tractor, a connector element secured to said foot member and positioned thereon for securement to said fifth wheel on the tractor, a hydraulic piston and cylinder assembly pivotally mounted at one end on said foot member and a generally rigid draft member of substantially fixed length under all operating conditions pivotally mounted at one end on said foot member.

10. In combination an automotive tractor and a load-carrying trailer, said trailer including wheels and a load-carrying member, a draft member, means connecting the draft member to the load-carrying trailer and to the tractor, said connecting means including articulated joint members, connecting the load-carrying trailer and the tractor respectively, the point of connection between the draft member and the load-carrying trailer being forward of the wheels of the load-carrying trailer, a fluid pressure piston and cylinder assembly carried solely by the trailer, at a point forward of the point of connection of the draft member thereto and positioned to react upon the tractor substantially at the point of connection of the draft member thereto, and means for supplying pressure fluid to said piston and cylinder assembly to cause it to move in elongation and thereby to raise the forward end of said load-carrying member to tip it, the draft member being effective during the tipping movement to cause the load-carrying member and the tractor to approach each other.

11. In combination an automotive tractor, a trailer attachment meants thereon, a foot member removably supported by said trailer attachment means and movable with respect thereto when so supported, a load-carrying body, ground-contacting supporting members for said load-carrying body connected thereto at a point separated from the point of attachment to said tractor, a fluid pressure piston and cylinder assembly mounted upon said foot member for movement with respect thereto and connected to said load body at a forward portion thereof for movement with respect thereto, draft means connecting said tractor and said load-carrying body for relative movement with respect to each other, said draft means including articulated connection means between its opposite ends and the tractor and the load-carrying body respectively, and means carried by said tractor for supplying pressure fluid to said piston and cylinder assembly to cause it elongation and thereby to raise the forward end of the body to tip it, raising of the body for tipping being effective to cause relative movement of the body and tractor whereby the ground-contacting members of the body and the tractor approach each other.

12. In combination an automotive tractor, a trailer attachment means thereon, a foot member removably supported by said trailer attachment means and movable with respect thereto when so supported, a load-carrying body, ground-contacting supporting members for said load-carrying body connected thereto at a point separated from the point of attachment to said tractor, draft means joined to said foot member for movement in relation thereto and connecting said tractor and said load-carrying body for relative movement with respect to each other, a fluid pressure piston and cylinder assembly mounted upon said foot member for movement with respect thereto and connected to said load-carrying body for movement with respect thereto, and means carried by said tractor for supplying pressure fluid to said piston and cylinder assembly to cause its elongation and thereby to raise the forward end of the body to tip it, raising of the body for tipping being effective to cause relative movement of the body and tractor whereby the ground-contacting members of the body and the tractor approach each other.

References Cited in the file of this patent

UNITED STATES PATENTS

| | | |
|---|---|---|
| 2,148,798 | Barrett | Feb. 28, 1939 |
| 2,166,722 | Kirksey | July 18, 1939 |
| 2,436,017 | Powers | Feb. 17, 1948 |
| 2,469,199 | Lewis | May 3, 1949 |
| 2,628,126 | Black | Feb. 10, 1953 |
| 2,635,919 | Watson | Apr. 21, 1953 |
| 2,661,236 | Schonrock | Dec. 1, 1953 |
| 2,686,692 | Hunter et al. | Aug. 17, 1954 |

FOREIGN PATENTS

| | | |
|---|---|---|
| 169,980 | Great Britain | June 29, 1922 |
| 273,099 | Great Britain | June 30, 1927 |

Notice of Adverse Decision in Interference

In Interference No. 91,129 involving Patent No. 2,846,267, J. W. Fields, Tipping body, final judgment adverse to the patentee was rendered June 14, 1962, as to claim 10.

[*Official Gazette October 16, 1962.*]